(12) United States Patent
Kallmeyer

(10) Patent No.: US 10,027,095 B1
(45) Date of Patent: Jul. 17, 2018

(54) RETROFIT KIT FOR A POWER SWITCH BOX

(71) Applicant: Kevin Allen Kallmeyer, Cincinnati, OH (US)

(72) Inventor: Kevin Allen Kallmeyer, Cincinnati, OH (US)

( * ) Notice: Subject to any disclaimer, the term of this patent is extended or adjusted under 35 U.S.C. 154(b) by 47 days.

(21) Appl. No.: 15/168,603

(22) Filed: May 31, 2016

Related U.S. Application Data

(60) Provisional application No. 62/168,076, filed on May 29, 2015.

(51) Int. Cl.
*H02B 1/00* (2006.01)
*H02B 1/46* (2006.01)
*H05K 5/02* (2006.01)

(52) U.S. Cl.
CPC ............ *H02B 1/46* (2013.01); *H05K 5/0204* (2013.01); *H05K 5/0217* (2013.01)

(58) Field of Classification Search
None
See application file for complete search history.

(56) References Cited

U.S. PATENT DOCUMENTS

| | | | | |
|---|---|---|---|---|
| 4,051,334 A | * | 9/1977 | Ericson ................ | H02B 11/133 |
| | | | | 200/50.25 |
| 4,783,718 A | * | 11/1988 | Raabe ..................... | H02B 1/42 |
| | | | | 361/634 |
| 5,463,533 A | * | 10/1995 | Donnerstag ............ | H02B 1/015 |
| | | | | 174/57 |
| 7,209,343 B2 | * | 4/2007 | Remmert ............... | H02B 1/056 |
| | | | | 361/634 |
| 2010/0288554 A1 | * | 11/2010 | Jafari ..................... | H02G 3/126 |
| | | | | 174/545 |

FOREIGN PATENT DOCUMENTS

WO 2015047371 A1 4/2015

\* cited by examiner

*Primary Examiner* — Dimary Lopez Cruz
(74) *Attorney, Agent, or Firm* — Daniel F. Nesbitt; Hasse & Nesbitt, LLC

(57) ABSTRACT

A retrofit kit for installing an updated electrical power switch box in a facility power station. The retrofit kit includes an adaptor support frame for attaching to a support structure of the facility power station and for a preselected or predetermined depth positioning of the updated electrical power switch box relative to the three line side bussings and the three load side bussings of the facility power station. The retrofit kit also includes adaptor bars that overlap with and connect the breaker stabs of the updated electrical power switch box to the bussings, and include three line side adaptor bars that connect the three line side breaker stabs to the respective three line side bussings, and three load side adaptor bars that connect the three load side breaker stabs to the respective three load side bussings.

6 Claims, 11 Drawing Sheets

RETROFIT KIT FOR A POWER SWITCH BOX

CROSS-REFERENCE TO RELATED APPLICATION

This application claims the benefit of U.S. Provisional Patent Application No. 62/168,076, filed on May 29, 2015, the disclosure of which is incorporated herein by reference.

BACKGROUND OF THE INVENTION

A conventional electrical power switch device (also called a "breaker") for shutting off three-phase AC electric power in a power station of an industrial facility includes a switch box includes three power supply or "line" stabs (terminals) on one side, usually on a top side (the line side), and three power outlet or "load" stabs on another side, usually the bottom side (the load side), of the device, with a breaker handle that electrically connects and disconnects the three line side breaker stabs to the three load side breaker stabs when the switch is thrown between connect and disconnect positions.

FIGS. 1 and 2 show a conventional electrical power switch device 100 mounted on support structures 50,52. The industrial facility employing low voltage electrical power (600V and lower) has a power station with three lines of power supply, terminating in three power supply or "line side" bussings 12,14,16. The three line side bussings 12,14, 16 are usually in a fixed, spaced-apart position upon a fixed structure of the facility. The lateral positions of the three line side bussings 12,14,16 are typically predetermined and fixed.

In the illustrated embodiment, the first line side bussing 12 includes a pair of nested, C-shaped conductive members 12*a*,12*b*, with outer conductive member 12*a* having an inner surface and the inner conductive member 12*b* having an outer surface. Likewise, second and third line side bussings 14 and 16 have outer conductive members 14*a*,16*a* having an inner contact surface and the inner conductive member 14*b*,16*b* having an outer contact surface. The inner and outer contact surfaces of the bussings lie in common planes, respectively.

The power switch device 100 (P frame breaker) includes a top end 102 and a bottom end 104, and a switch arm (not shown). Three spaced-apart line side breaker stabs 112,114, 116 extend in rigidly fixed positions from the top end 102, each with opposed outer-facing and inner-facing surfaces that lie in respective common planes. Three spaced-apart load side breaker stabs 122,124,126 extend in rigidly fixed positions from the bottom end 104.

Each of the line side breaker stabs 112,114,116 are placed into electrically conductive position with the line side bussings 12,14,16, by inserting the line side breaker stabs between the confronting contact surfaces of the inner and outer conductive members of the line side bussings 12,14, 16, and securing them tightly together to minimize electrical resistance between the line side bussings and the line side breaker stabs. To illustrate, FIG. 2 shows the middle line side breaker stab 114 positioned in conductive contact with the line side bussing 14, between the confronting faces 15*a* and 15*b*, respectively, of line side bussing conductive members 14*a* and 14*b*. Each line side bussing 12,14,16 has a centered opening 18 through the outer surface 13,15,17, through which a bolt 60 and nut 61, or other fixture, can be passed, which also passes through a similar centered opening 218 in the line side breaker stabs, to secure the line side bussings 12,14,16 to the respective three line side breaker stabs 112,114,116 of the switch box 100.

Similarly, each lower load side breaker stab 122,124,126 is placed into electrically conductive position with the respective load side bussings 22,24,26. In FIG. 2, the middle load side breaker stab 124 is positioned into conductive contact with the load side bussing 24. In an alternative securement arrangement, the load side breaker stabs 122, 124,126 are secured flush against the outer surface of the load side bussings 22,24,26, and secured tightly together with a bolt 60 and nut 61.

The line side bussings and the load side bussings of the facility are secured in a fixed position within the support structure of the facility, and usually cannot be easily moved or repositioned. The line side bussings and the load side bussings are typically made of a copper bar material, to minimize resistance to the flow of electrical current. Similarly, the line side breaker stabs and the load side breaker stabs of the switch box are typically made of a copper bar material, and the confronting surfaces of the bussings and stabs are smooth and planar in order to minimize resistance to the flow of the electrical current.

When it becomes necessary, the conventional switch box 100 may be replaced by an updated switch box, which may not have the same size and dimensions as the conventional switch box 100. In such a situation, the installation of the updated switch box to the support structure 50,52 can be troublesome if the line side breaker stabs and load side breaker stabs of the updated switch box do not align with the line side bussings and load side bussings.

SUMMARY OF THE INVENTION

The present invention provides a retrofit kit for an electrical power switch box. The kit includes an adaptor support frame for the positioning of an updated electrical power switch box relative to the line side bussings and the load side bussings of the facility power station, and a plurality of adaptor bars that connect the respective line side breaker stabs and load side breaker stabs of the updated electrical power switch box, respectively, to the line side bussings and the load side bussings of the facility power station.

The adaptor support frame includes one or more legs, and a mounting surface. The legs of the support frame are configured to attach to the support structures of the facility power station, and to extend the mounting surface to a preselected or predetermined position away from the support structures. The updated electrical power switch box is then secured to the mounting surface. The preselected or predetermined depth of the support frame, from the mounting surface to the ends of the one or more legs, positions the line side breaker stabs and the load side breaker stabs of the updated electrical power switch box for connection to the line side bussings and the load side bussings.

In a preferred embodiment, an adaptor bar is inserted between each of the line side breaker stabs of the updated electrical power switch box, and the respective line side bussings of the facility power station, and between each of the load side breaker stabs of the switch box, and the respective load side bussings of the facility power station. This embodiment is needed when the lateral and vertical positions of the line and load stabs of the updated switch box do not align with the bussings. For example, if the updated switch box is shorter in height than the conventional switch box, the line side breaker stabs do not overlap vertically with the line side bussings, and/or the load side breaker stabs do not overlap vertically with the load side bussings, to provide necessary and sufficient electrical connection. Likewise, if the updated switch box is wider than the conventional switch box, or has stabs with different lateral spacing than the lateral spacing of the bussings, the line side breaker stabs do not overlap laterally with the line side bussings, and/or the load side breaker stabs do not overlap laterally with the load side bussings, and may not provide sufficient electrical connection, or allow proper securement of the stabs to the bussings. The line side adaptor bars are secured to the line side stabs of the updated switch box to provide both sufficient electrical connection and proper securement between the line side breaker stabs and the line side bussings. Likewise, the load side adaptor bars are secured to the load side stabs of the updated switch box to provide both sufficient electrical connection and proper securement between the load side breaker stabs and the load side bussings.

DETAILED DESCRIPTION OF THE INVENTION

Figure 1:
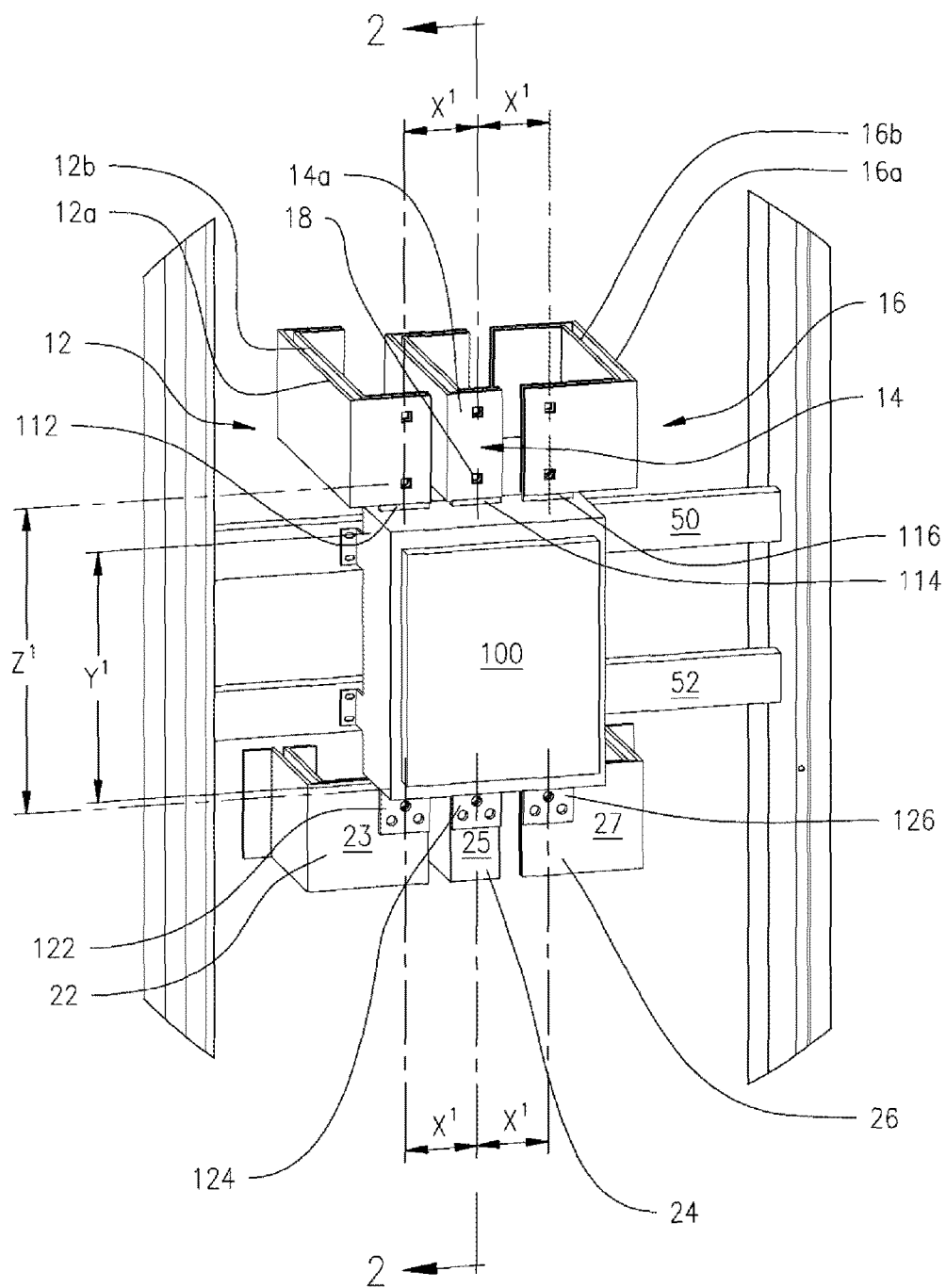
FIG. 1 shows a conventional switch box in a secured position for connection with the line side bussings and load side bussings of a facility.
Figure 2:
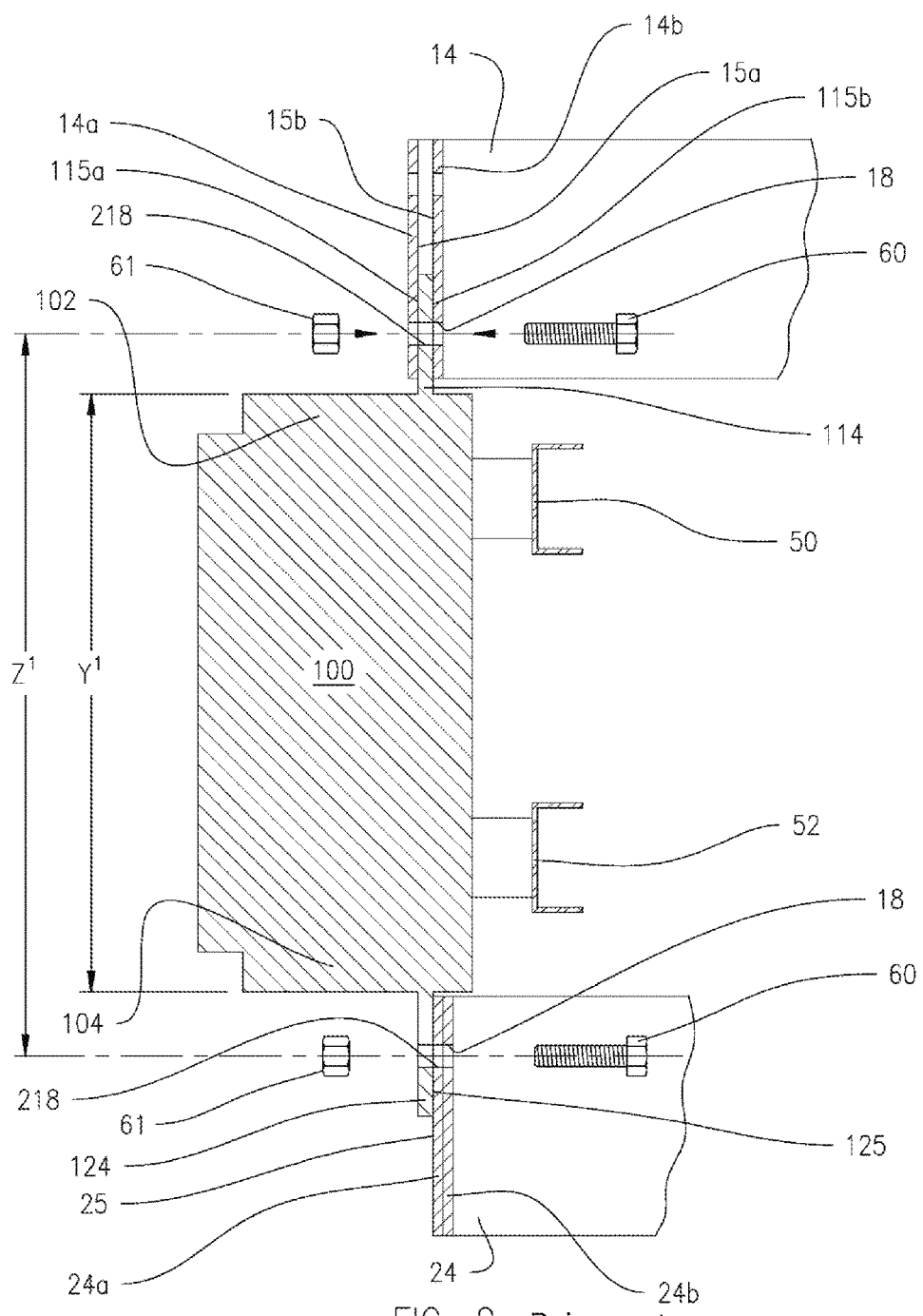
FIG. 2 shows a sectional view of the conventional switch box in the secured position, taken through line 2-2 of FIG. 1.
Figure 3:
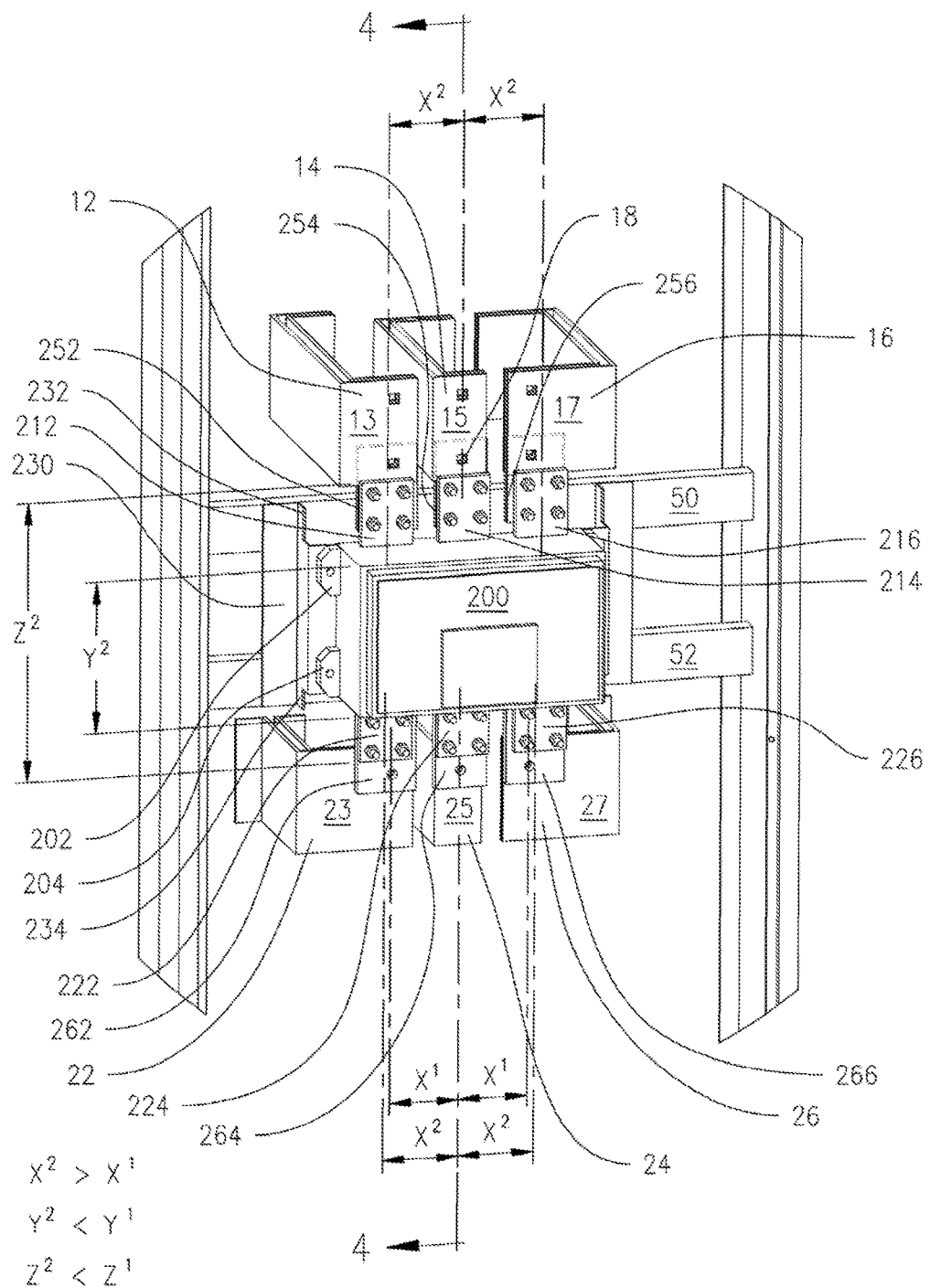
FIG. 3 shows an updated switch box and an adaptor support frame in a secured position for connection with the line side bussings and load side bussings of the facility through respective line side and load side adaptor bars.
Figure 4:
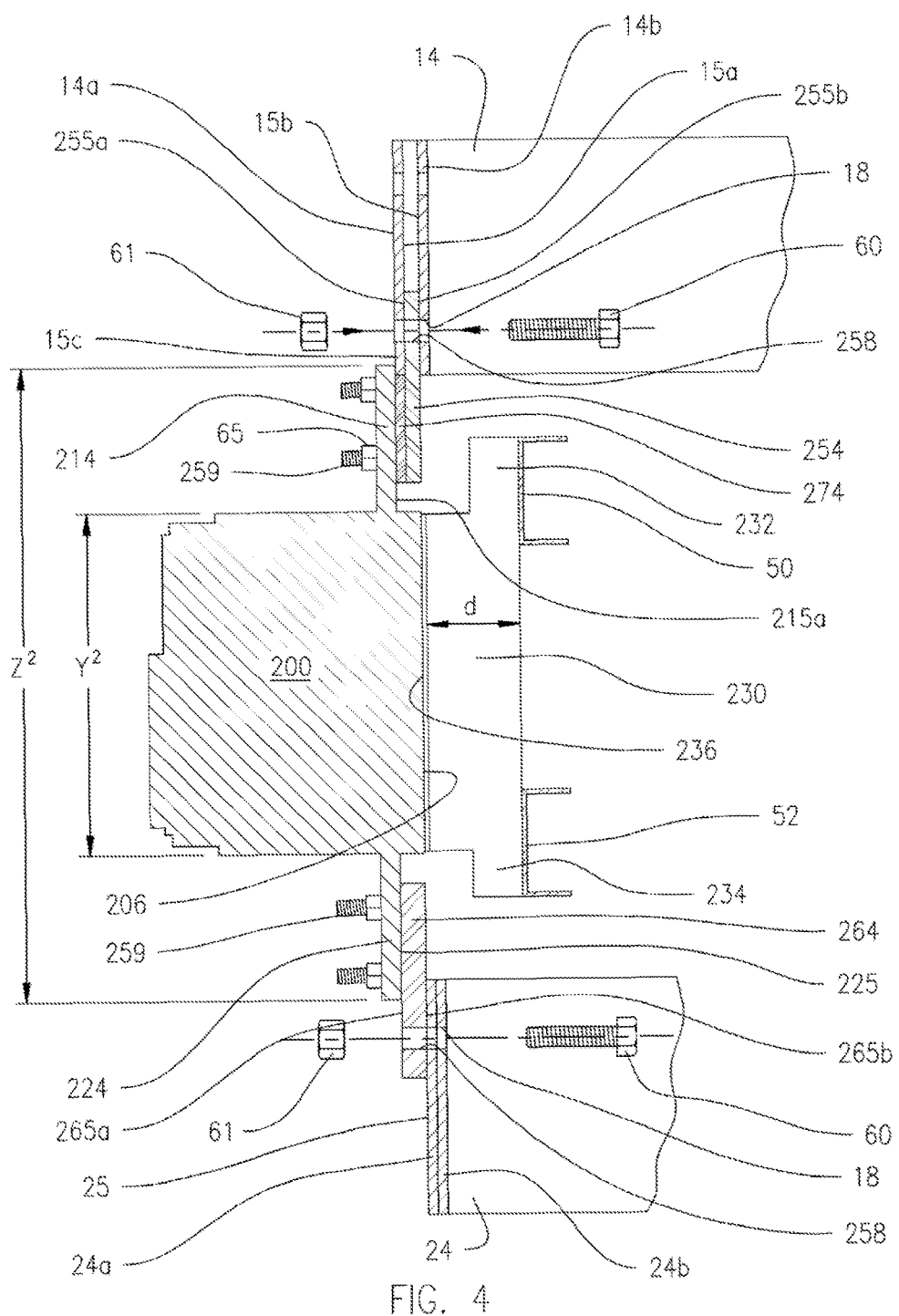
FIG. 4 shows a sectional view of the updated switch box and the adaptor support frame in the secured position, taken through line 4-4 of FIG. 3.

FIGS. 3 and 4 show an updated (or replacement) electrical power switch box 200 installed in place of a conventional switch box 100.

The updated switch box 200 (R frame breaker) has a height substantially shorter than that of the conventional switch box 100. Consequently, the upper stabs 212,214,216 of the updated switch box just partially overlap vertically with bottom portions of the upper line side bussings 12,14, 16, and the lower stabs 222,224,226 of the updated switch box partially overlap vertically with top portions of the lower load side bussings 22,24,26.

In addition, the updated switch box 200 has a width significantly greater than the conventional switch box 100, and the upper stabs 212,214,216 of the updated switch box 200 are spaced apart laterally a greater distance than were the upper stabs 112,114,116 of the conventional switch box 100, and therefore do not align laterally with the upper line side bussings 12,14,16. Specifically, the vertical centerlines of the upper stabs 212,214,216 of the updated switch box 200 do not align with the vertical centerlines, or the centered openings 18, of the upper line side bussings 12,14,16.

Furthermore, the updated switch box 200 is configured with less depth (in the forward and rear directions) between the upper stabs 212,214,216 and lower stabs 222,224,226, and the rear mounting surface 206 of the switch box 200, compared to that of the conventional switch box 100. In order to position the upper stabs 212,214,216 and lower stabs 222,224,226 of the updated switch box 200 for securement to the upper line side bussings 12,14,16 and lower load side bussings 22,24,26, an adaptor support frame 230 is provided between the updated switch box 200 and the support structures 50,52. The adaptor support frame 230 includes legs 232 and 234 on opposite sides that are mounted to the support structures 50,52 using fasteners such as bolts and nuts. The adaptor support frame 230 also includes a mounting surface 236 that consists of a planar surface with holes for mounting the rear surface 206 of the updated switch box 200. The depth (d) of the support frame 230, from the end of the legs 232,234 to the mounting surface 236, places the updated switch box 200 into a proper position for installation.

Figure 6:
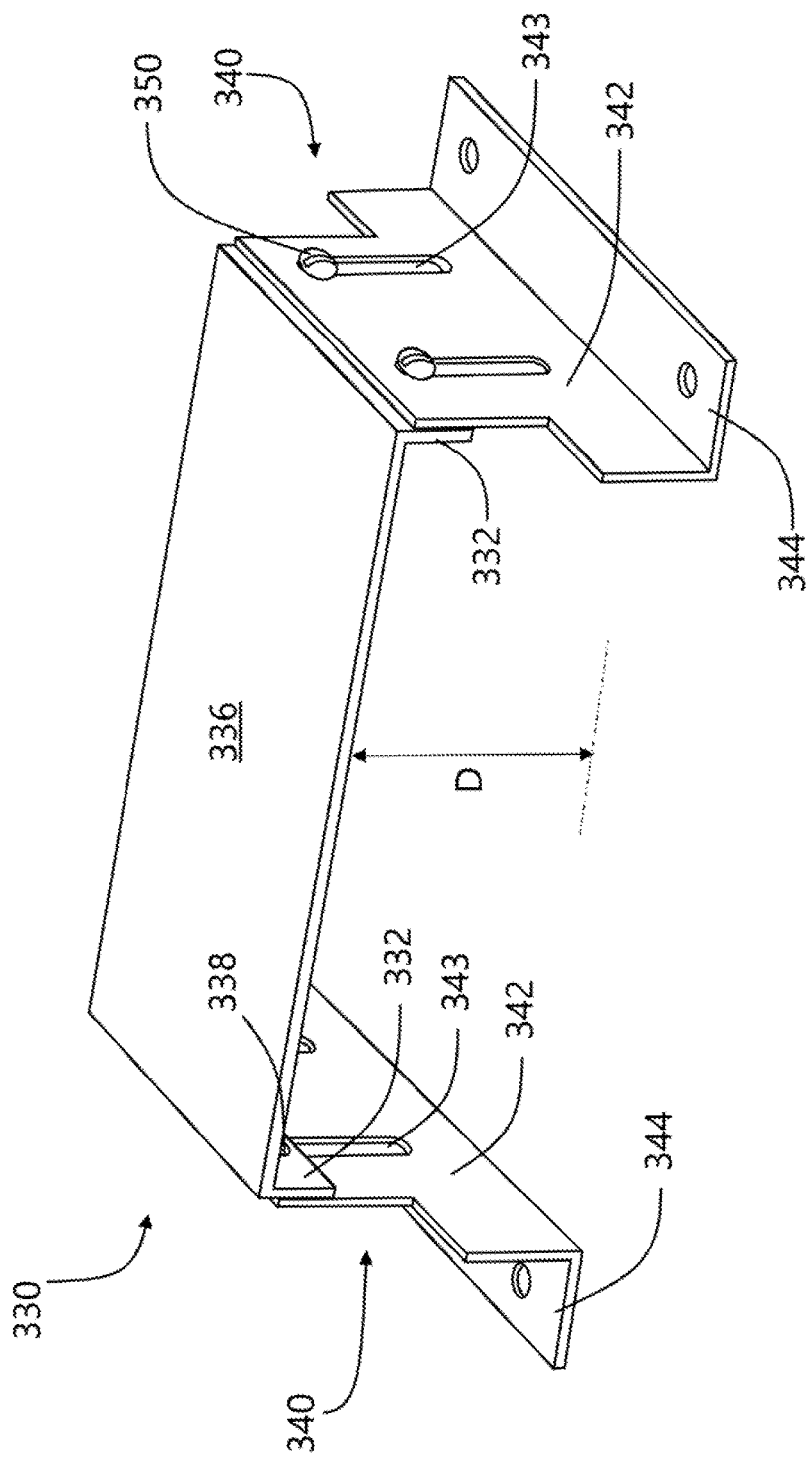
FIG. 6 shows an adjustable support frame for adjusting the depth of the mounting surface from a support structure.
Figure 7:
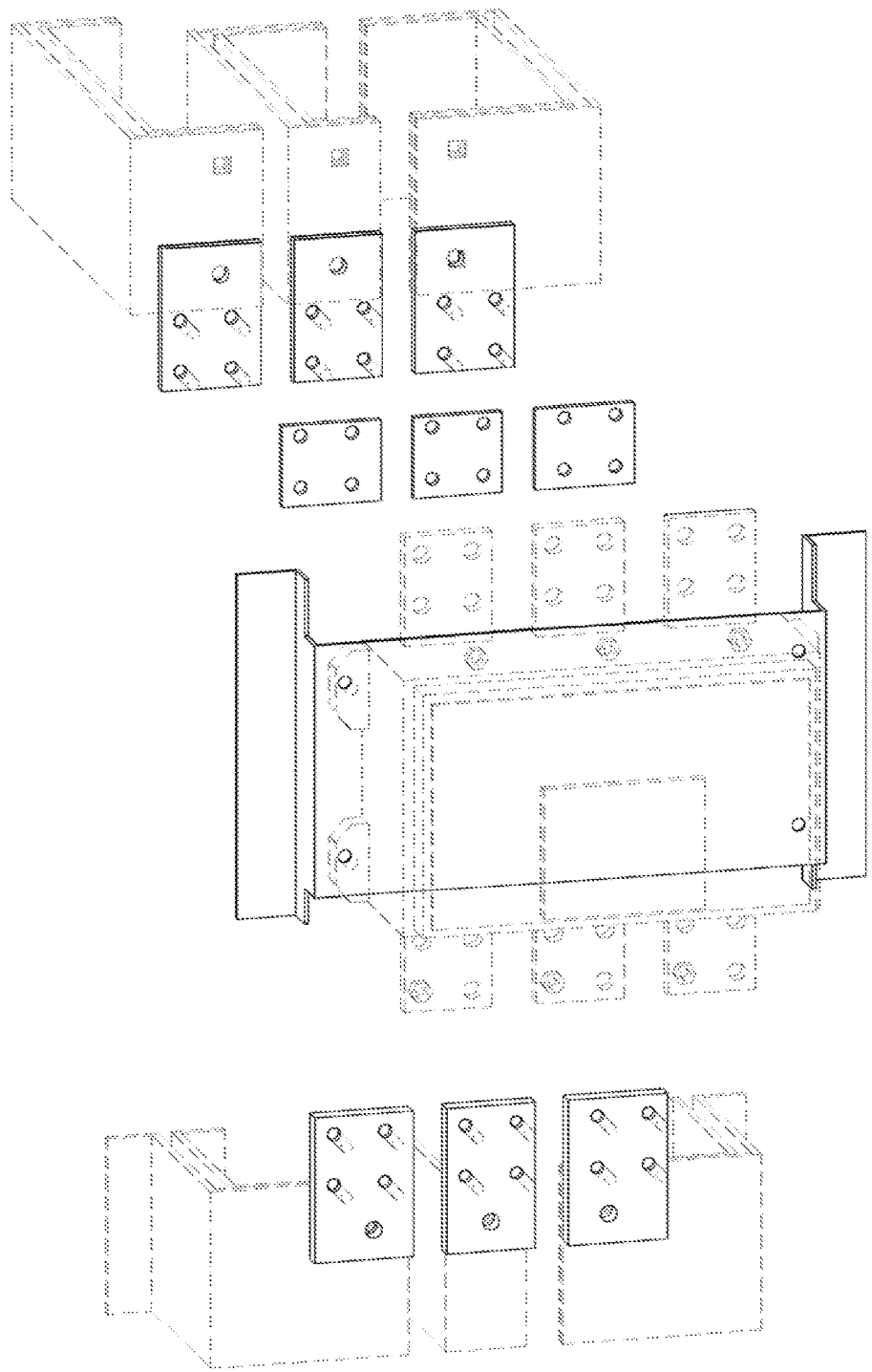
FIG. 7 shows an exploded, perspective view of the set of adaptor bars and an adaptor support frame, for adapting a switch box for connection with line side bussings and load side bussings of a facility, including line side adaptor bars and load side adaptor bars.
Figure 8:
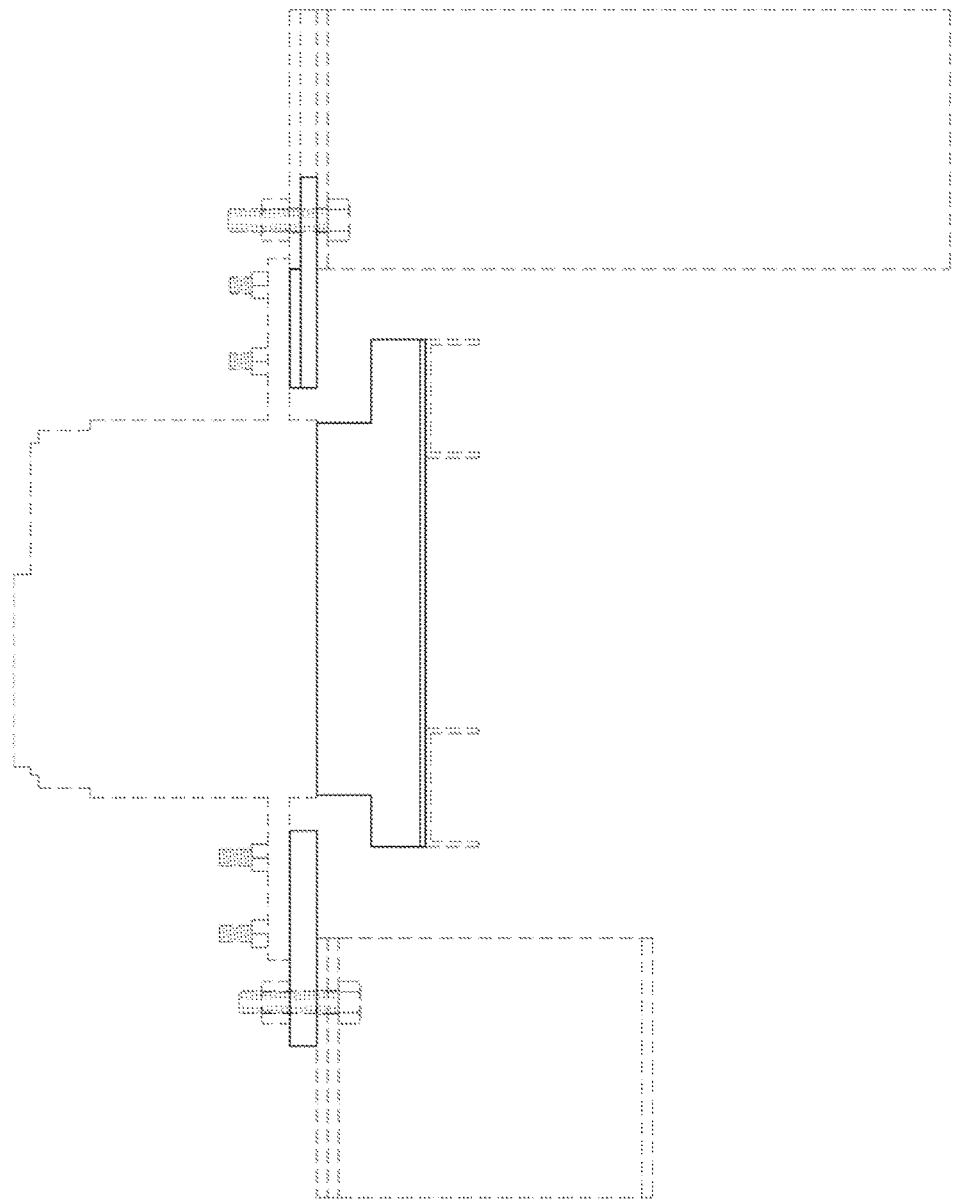
FIG. 8 shows a right side view of the set of adaptor bars and the adaptor support frame, with the left side view being a mirror image thereof.
Figure 9:
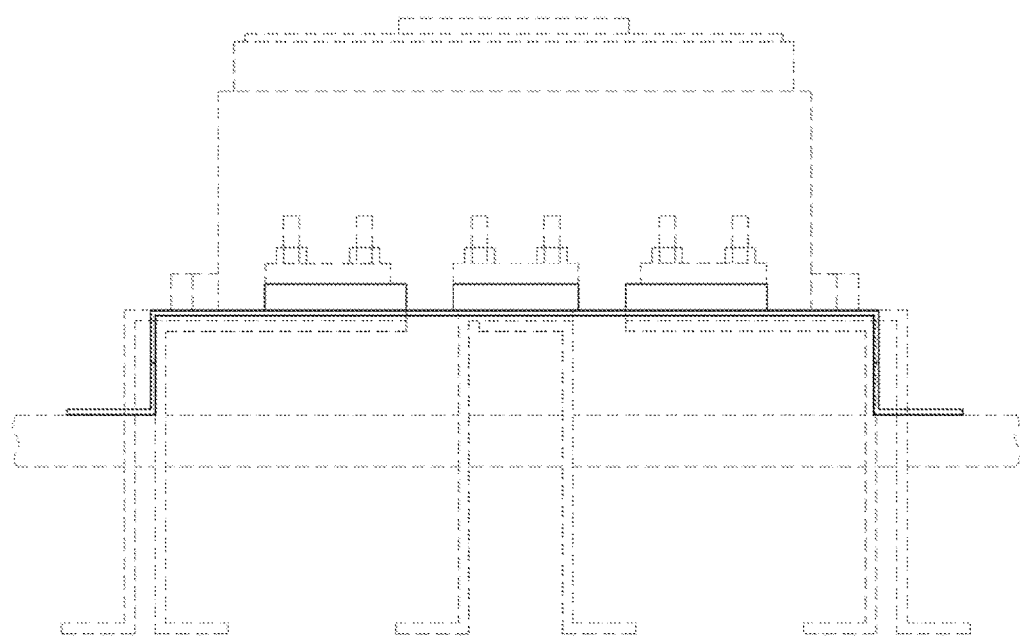
FIG. 9 shows a top view of the set of adaptor bars and the adaptor support frame.
Figure 10:
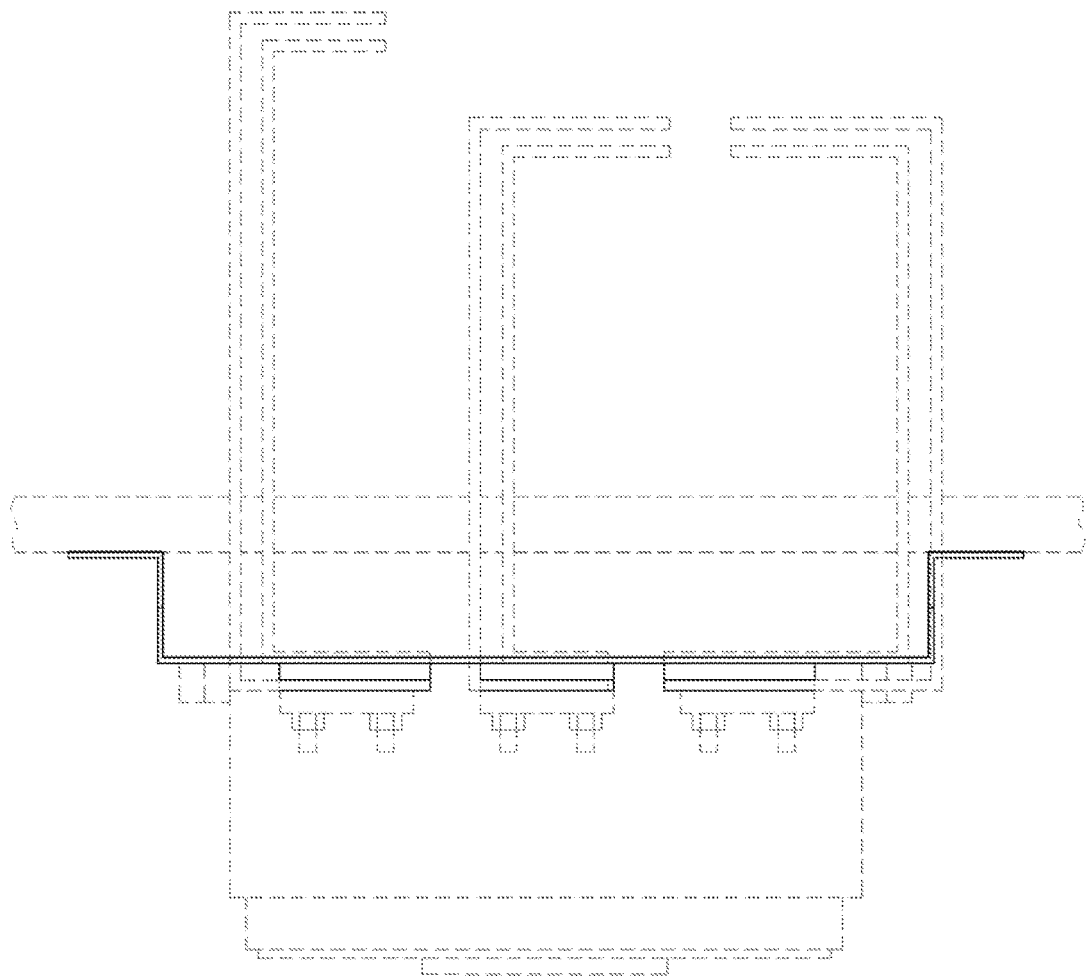
FIG. 10 shows a bottom view of the set of adaptor bars and the adaptor support frame.
Figure 11:
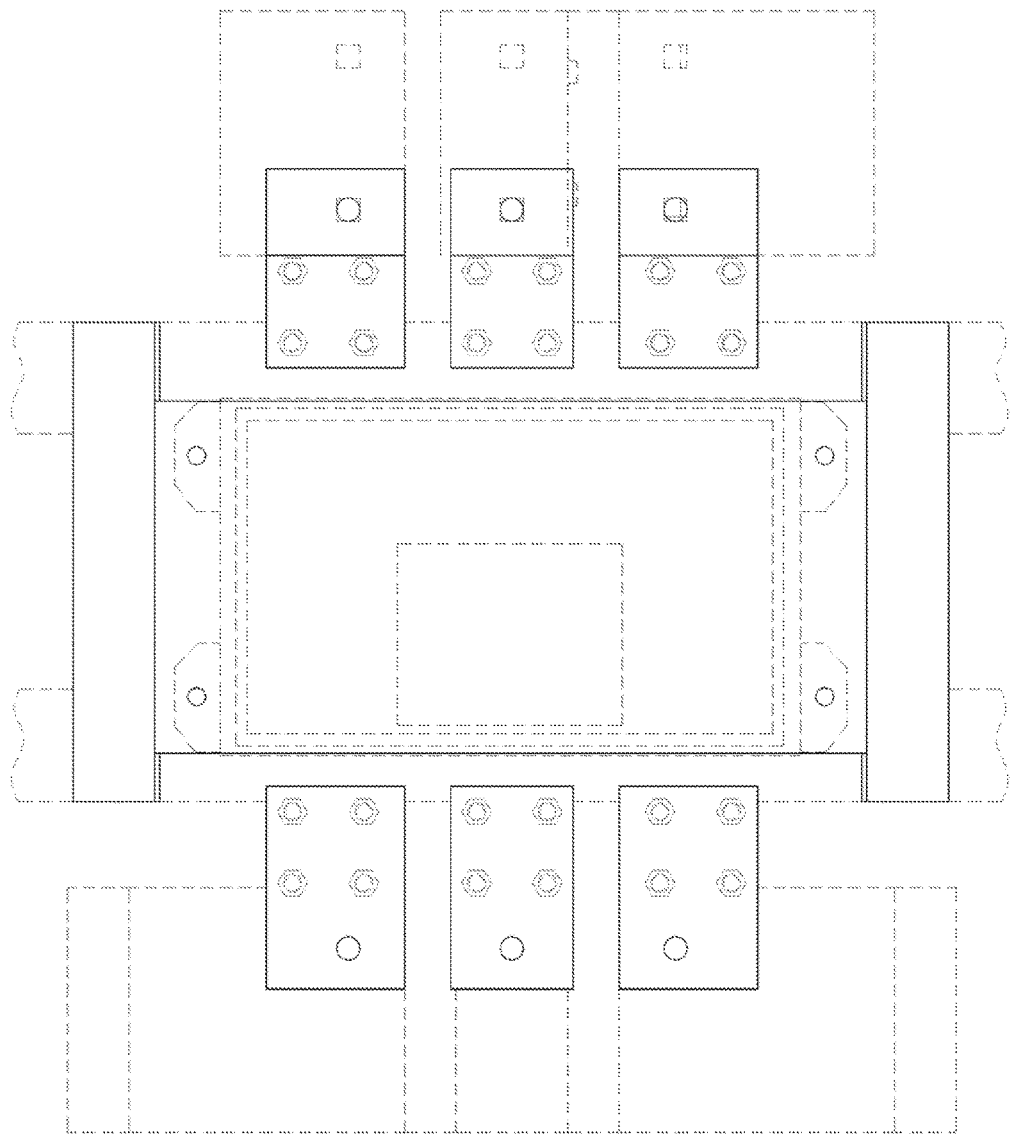
FIG. 11 shows a front view of the set of adaptor bars and the adaptor support frame, with the rear view being a mirror image thereof.

In an alternative embodiment of the invention, the adaptor support frame can provide depth adjustability of the mounting surface. FIG. 6 shows to an adjustable support frame 330 having adjustable-length legs 340 and 350 on opposite sides of the mounting surface 336 for universally or incrementally adjusting the depth (D) of the mounting surface 336 from the support structures 50,52. The adjustable-length legs 340 consist of a downturned wall 332 extending from each end of the mounting surface 336, and a base leg 342 slidingly attached to each of the downturned walls 332. The leg wall 342 includes a base 344 that extends laterally from the base end of the leg wall 342, for securing the leg wall 342 and the support frame to the respective support structures 50,52. Each leg wall 342 also has a pair of elongated slots 343 on lateral sides of the leg wall 342. A securement such as bolt 350 extends through a hole in the downturned wall 332 and slot 343, which can be loosened and tightened to adjust the depth D of the mounting surface 336 from the support structures 50,52 (FIG. 3).

Upper line side adaptor bars 252,254,256 are disposed in planar contact between the line side bussings 12,14,16, respectively, and the line side breaker stabs 212,214,216, respectively, of the updated switch box 200. An upper portion of the line side adaptor bar 254 is disposed and compressed between the line side bussing conductive members 14a,14b, and is secured with a bolt 60 and nut 61. The upper portion of the upper adaptor bar 254 is sufficient to conduct the electrical current with minimum resistance. As shown in FIG. 4, a lower portion of the middle line side adaptor bar 254 is disposed and compressed against an outer surface 215a of the middle line side breaker stab 214. The four stab bolts 259 are press-fit through bores in the adaptor bar 254, and have tapered bolt heads that recess into a recess bore in the surface of the adaptor bar 254. The four stab bolts 259 extend through the four holes 218 in the upper line side breaker stab 214 and are secured by four nuts 65.

As shown in FIG. 4, when an upper portion of a (middle line side breaker stab 214 overlaps only a small portion of the line side bussing 14, a leveling plate 274 can be positioned against the outer surface of the lower portion of the line side adaptor bar 254, to fill the space adjacent the thickness of the line side bussing conductive member 14a, and create a flush surface for securement of the line side breaker stab 214. The leveling plate 274 has four holes for press-fitting the leveling plate 274 over the ends of the bolts 259 to form a unitary device, and is made of an electrically conductive material, typically the same material as the adaptor bar.

Figure 5:
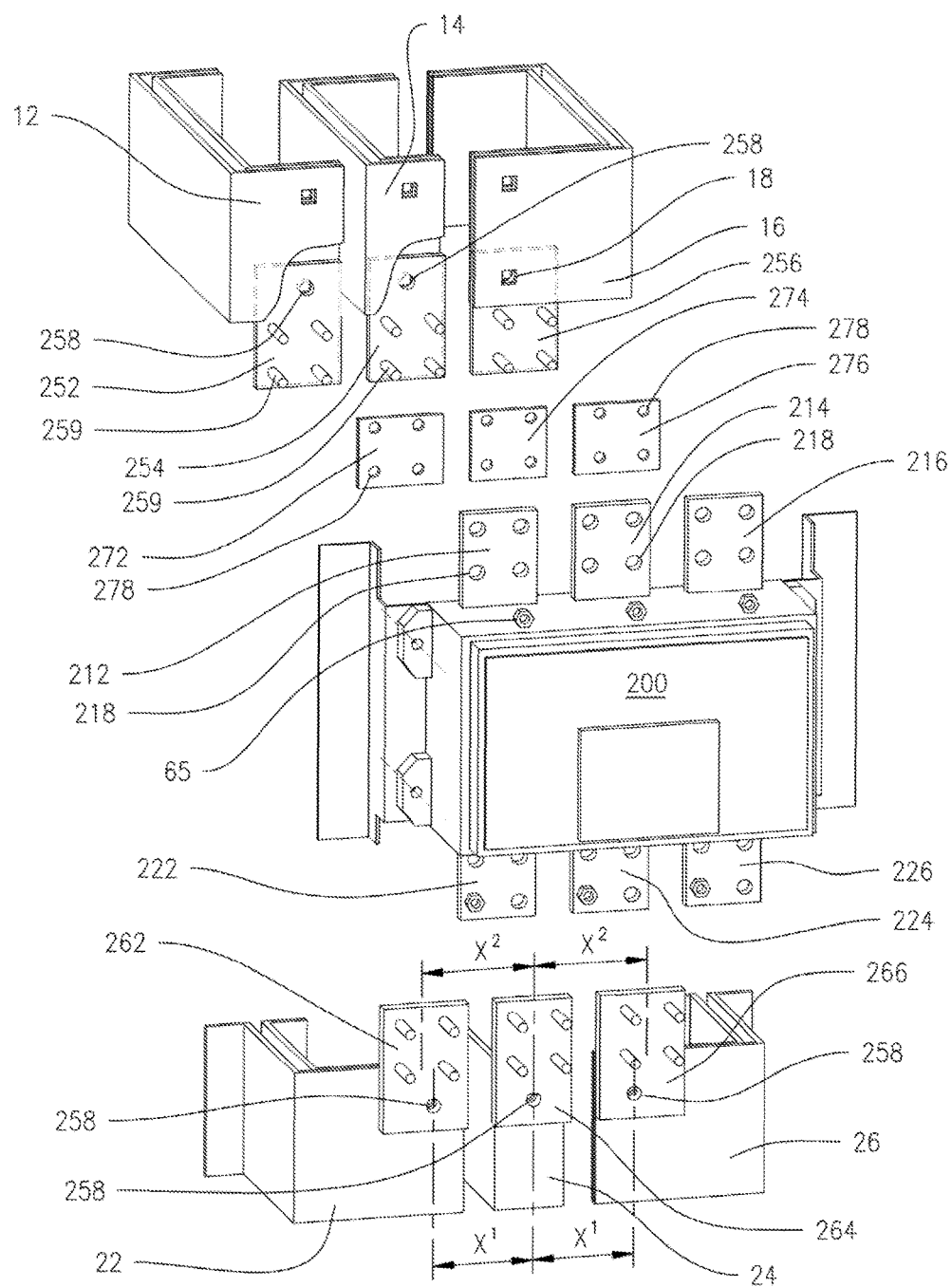
FIG. 5 shows an exploded perspective view of the updated switch box, the adaptor support frame, and adaptor base.

As shown in FIGS. 3 and 5, the lower portion of the line side adaptor bars 252,254,256 bolt, typically symmetrically, to the line side breaker stabs 212,214,216. The bolt opening 258 in the upper portion of the middle upper adaptor bar 254 is centered, and aligns with the centered bolt opening 18 of the line side bussing 14. However, since the horizontal spacing between the bolt openings 18 of the line side bussings 12,14,16 is a distance x1, while the vertical centerlines of the line side breakers stabs 212,214,216 is larger distance x2, the bolt openings 258 in the upper portions of the left line side adaptor bar 252 and the right line side adaptor bar 256 are off-centered, and biased toward the center to align with the bolt openings 18 of the left and right line side bussings 12 and 16.

Lower, load side adaptor bars 262,264,266 are disposed in planar contact between the lower load side bussings 22,24, 26, respectively, and the load side breaker stabs 222,224, 226, respectively, of the updated switch box 200. A lower portion of the middle load side adaptor bar 264 is disposed and secured against an outer surface 25 of the middle load side bussing 24, and is secured with a bolt 60 and nut 61. An upper portion of the adaptor bar 264 is disposed and compressed against an inner surface 225 of the lower load side breaker stab 224, and is secured by four stab bolts 259 and nuts, the stab bolts 259 being press-fit into the adaptor bar 264. The overlapping upper portion of the load side adaptor bar 264 is sufficient to conduct the electrical current with the lower load side breaker stab 224, with minimum resistance, and the overlapping lower portion of the load side adaptor bar 264 is sufficient to conduct the electrical current with the lower load side bussing 24, with minimum resistance.

As with the line side adaptor bars, and as illustrated in FIGS. 3 and 5, the bolt openings 258 in the lower portions of the left load side adaptor bar 262 and the right load side adaptor bar 266 are off-centered, and biased toward the center, to align with the bolt openings 18 of the left and right load side bussings 22 and 26.

It can be understood that the adaptor bars on either the line side end or the load side end can be heights and widths than can vary to suit the size, dimensions and positions of the line side breaker stabs and the load side breaker stabs of other updated switch boxes. It can also be understood that the upper line side adaptor bar(s) and the lower load side adaptor bar(s) can have the same or different height, width, and/or thickness dimensions.

I claim:

1. A retrofit kit for an electrical power switch box of a facility power station, the facility power station including three line side bussings and the three load side bussings, and the electrical power switch box including three line side breaker stabs and three load side breaker stabs, the kit including:
    a) an adaptor support frame, configured for attaching to a support structure of the facility power station, and for a depth positioning of an updated electrical power switch box relative to the three line side bussings and the three load side bussings of the facility power station, and
    b) a plurality of adaptor bars, including three line side adaptor bars that connect the three line side breaker stabs to the respective three line side bussings, and three load side adaptor bars that connect the three load side breaker stabs to the respective three load side bussings, the three line side adaptor bars being configured to overlap a portion of the line side bussings and the three line side breaker stabs of the switch box, and the three load side adaptor bars being configured to overlap a portion of the load side bussings and the three load side breaker stabs of the switch box.

2. The retrofit kit according to claim 1, wherein the adaptor support frame includes one or more legs, and a mounting surface, the legs configured to attach to the support structure of the facility power station, and to extend the mounting surface of the adaptor support frame to a preselected or predetermined position away from the support structure.

3. The retrofit kit according to claim 1, wherein at least one of the adaptor bars has a hole that is off centered, through which a fastener is placed for securing the at least one adaptor bar to a respective line side bussing or load side bussing.

4. The retrofit kit according to claim 1, wherein the adaptor support frame is an adjustable support frame having adjustable-length legs on opposite sides of the adjustable support frame for adjusting the depth of the mounting surface from the support structure.

5. The retrofit kit according to claim 1 wherein the three line side adaptor bars connect planarly with each of the three line side breaker stabs and to each of the respective three line side bussings, and the three load side adaptor bars connect planarly with the three load side breaker stabs and to each of the respective three load side bussings.

6. The retrofit kit according to claim 5 wherein the three line side adaptor bars are configured to overlap at least one of laterally or vertically with a portion of the line side bussings and a portion of the three line side breaker stabs of the switch box, and the three load side adaptor bars are configured to overlap at least one of laterally or vertically with a portion of the load side bussings and a portion of the three load side breaker stabs of the switch box.

* * * * *